US012810517B2

(12) United States Patent
Kim

(10) Patent No.: US 12,810,517 B2
(45) Date of Patent: Nov. 24, 2026

(54) APPARATUS AND METHOD FOR PROVIDING SPEECH VIDEO

(71) Applicant: DEEPBRAIN AI INC., Seoul (KR)

(72) Inventor: Doo Hyun Kim, Gyeonggi-do (KR)

(73) Assignee: DEEPBRAIN AI INC., Seoul (KR)

( * ) Notice: Subject to any disclaimer, the term of this patent is extended or adjusted under 35 U.S.C. 154(b) by 117 days.

(21) Appl. No.: 18/839,550

(22) PCT Filed: Aug. 23, 2022

(86) PCT No.: PCT/KR2022/095118

§ 371 (c)(1),
(2) Date: Aug. 19, 2024

(87) PCT Pub. No.: WO2024/038976

PCT Pub. Date: Feb. 22, 2024

(65) Prior Publication Data

US 2025/0157112 A1 May 15, 2025

(30) Foreign Application Priority Data

Aug. 16, 2022 (KR) ........................ 10-2022-0102317

(51) Int. Cl.
*G06T 13/40* (2011.01)
*G06T 13/20* (2011.01)
*G10L 13/02* (2013.01)

(52) U.S. Cl.
CPC ............ *G06T 13/205* (2013.01); *G06T 13/40* (2013.01); *G10L 13/02* (2013.01)

(58) Field of Classification Search
CPC ........ G06T 13/205; G06T 13/40; G10L 13/02
See application file for complete search history.

(56) References Cited

U.S. PATENT DOCUMENTS 11,967,336 B2 * 4/2024 Kim ........................ G10L 21/10
2009/0132371 A1 * 5/2009 Strietzel ................. G06Q 30/02
705/14.46
2025/0315631 A1 * 10/2025 Waibel .................... G10L 21/10

FOREIGN PATENT DOCUMENTS

KR 10-2000-0009490 A 2/2000
KR 10-1925440 B1 12/2018
(Continued)

OTHER PUBLICATIONS

International Search Report for PCT/KR2022/095118 mailed on May 9, 2023.

*Primary Examiner* — Antonio A Caschera
(74) *Attorney, Agent, or Firm* — The PL Law Group, PLLC

(57) ABSTRACT

In a method for providing a speech video performed by a computing device according to one embodiment, first sections of a plurality of standby state videos are sequentially played back, wherein each standby state video includes the first section in which a person in the video is in a standby state and a second section for image interpolation between a last frame of the first section and a reference frame, a plurality of speech state images in which the person in the video is in a speech state and a speech voice based on a source of speech contents are generated and played back, when the generating of the plurality of speech state images and the speech voice is completed, the second section of the standby state video being played back at the time of completion, and a synthesized speech video is generated by synthesizing the plurality of speech state images and the speech voice with at least some of the plurality of standby state videos.

14 Claims, 7 Drawing Sheets

(56) References Cited

FOREIGN PATENT DOCUMENTS

| | | | | |
|---|---|---|---|---|
| KR | 10-2019-0085883 | A | | 7/2019 |
| KR | 10-2022-0057754 | A | | 5/2022 |
| KR | 10-2022-00557754 | | * | 5/2022 |
| WO | WO 2017/094527 | A1 | | 6/2017 |

* cited by examiner

APPARATUS AND METHOD FOR PROVIDING SPEECH VIDEO

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/095118, filed Aug. 23, 2022, which claims priority to the benefit of Korean Patent Application No. 10-2022-0102317 filed in the Korean Intellectual Property Office on Aug. 16, 2022, the entire contents of which are incorporated herein by reference.

BACKGROUND

1. Technical Field

The present invention relates to a technology of providing speech video.

2. Background Art

With the recent technological development in the field of artificial intelligence, various types of content are being generated based on artificial intelligence (AI) technology. For example, there is a case in which, when there is a voice message to be transmitted, a speech moving image (video) is generated as if a famous person (for example, a president) speaks the voice message in order to draw people's attention. This is achieved by generating mouth shapes or the like to fit a specific message, just like a famous person speaking the specific message in a moving image of the famous person.

In addition, technologies that allow artificial intelligence (AI) to conduct conversations with humans are being studied. In the technologies, synthesizing speech images takes time and requires a lot of data, and thus it is difficult to generate a video of a conversation (or speech video) in real time, which may lead to a problem.

SUMMARY

An object is to provide an apparatus and a method for providing an artificial intelligence-based speech video in real time.

A method for providing a speech video performed by a computing device according to one aspect includes sequentially playing back first sections of a plurality of standby state videos, wherein each standby state video includes the first section in which a person in the video is in a standby state and a second section for image interpolation between a last frame of the first section and a reference frame, generating a plurality of speech state images in which the person in the video is in a speech state and a speech voice based on a source of speech contents, playing back, when the generating of the plurality of speech state images and the speech voice is completed, the second section of the standby state video being played back at the time of completion, and generating a synthesized speech video by synthesizing the plurality of speech state images and the speech voice with at least some of the plurality of standby state videos.

In the playing back of the second section of the standby state video being played back at the time of completion, playback of the first section of the standby state video being played back at the time of completion may be completed and the second section of the standby state video may be played back.

The sequential playing back of the first sections of the plurality of standby state videos may include sequentially and repeatedly playing back the first sections of the plurality of standby state videos.

The last frame of the first section of a preceding standby state video and the first frame of the first section of a standby state video following the preceding standby state video may be naturally connected to each other.

The plurality of speech state images may be face images of the person in the video.

In the generating of the synthesized speech video, the synthesized speech video may be generated by replacing a face of the person in the video with each speech state image and synthesizing the speech state image and the speech voice. The reference frame may be the first frame of the first section of a first standby state video among the plurality of standby state videos.

In the generating of the synthesized speech video, the synthesized be generated by speech video may synthesizing the plurality of speech state images and the speech voice for frames within the first section of each standby state video, starting from the first frame of the first section of the first standby state video.

An apparatus for providing a speech video according to another aspect includes a speech state image generator configured to generate a plurality of speech state images in which a person in the video is in a speech state based on a source of speech contents while sequentially playing back first sections of a plurality of standby state videos, wherein each standby state video includes the first section in which the person in the video is in a standby state and a second section for image interpolation between a last frame of the first section and a reference frame, a speech voice generator configured to generate a speech voice based on the source of the speech contents while sequentially playing back the first sections of the plurality of standby state videos, a playback unit configured to sequentially play back the first sections of the plurality of standby state videos, and when the generating of the plurality of speech state images and the speech voice is completed, play back the second section of the standby state video being played back at the time of completion, and a synthesized speech video generator configured to generate a synthesized speech video by synthesizing the plurality of speech state images and the speech voice with at least some of the plurality of standby state videos.

The playback unit may complete playback of the first section of the standby state video being played back at the time of completion and play back the second section of the standby state video.

The playback unit may sequentially and repeatedly play back the first sections of the plurality of standby state videos.

The last frame of the first section of a preceding standby state video and the first frame of the first section of a standby state video following the preceding standby state video may be naturally connected to each other.

The plurality of speech state images may be face images of the person in the video.

The synthesized speech video generator may generate the synthesized speech video by replacing a face of the person in the video with each speech state image and synthesizing the speech state image and the speech voice.

The reference frame may be the first frame of the first section of a first standby state video among the plurality of standby state videos.

The synthesized speech video generator may generate the synthesized speech video by synthesizing the plurality of speech state images and the speech voice for frames within the first section of each standby state video, starting from the first frame of the first section of the first standby state video.

By using a plurality of standby state videos in a video file format rather than an image file format, it is possible to reduce a loading time of a terminal compared to the image file format, and accordingly, it is possible to add various postures or gestures of a person to the standby state videos.

In addition, by generating speech state images and a speech voice while sequentially playing back the plurality of standby state videos and synthesizing the generated images and voice with the plurality of standby state videos, it is possible to generate the synthesized speech video in real time, and accordingly, possible to provide conversation-related services based on artificial intelligence in real time.

In addition, by generating the synthesized speech video by generating a speech state image for a face part of a person in the standby state video and replacing only the face part of the standby state video with the speech state image, it is possible to reduce the amount of data while reducing the time required for generating the synthesized speech video.

In addition, by preparing the standby state videos to each include a first section including standby state image frames and a second section including back motion image frames, returning to a first frame of the first section of the first standby state video through the back motion image frames of the second section, and then synthesizing the speech state images and the speech voice from the first frame of the first section of the first standby state video, it is possible to easily generate the synthesized speech without considering other factors, no matter when the speech state image and the speech voice are generated while sequentially playing back the plurality of standby state videos.

DETAILED DESCRIPTION

Figure 1:
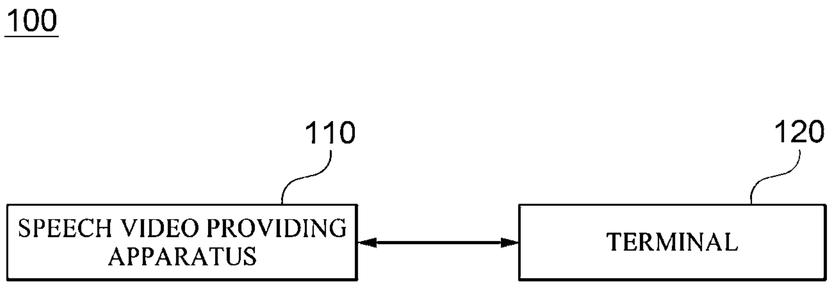
FIG. 1 is a diagram illustrating a conversation system using artificial intelligence according to an exemplary embodiment.

Hereinafter, one embodiment of the present invention will be described in detail with reference to the accompanying drawings. In adding reference numerals to the components of each drawing, it should be noted that the same components are given the same reference numerals as much as possible even though they are shown on different drawings. In addition, in describing the present invention, if it is determined that the detailed description of the known function or configuration related to the present invention may unnecessarily obscure the subject matter of the present invention, the detailed description thereof will be omitted.

Meanwhile, for steps described herein, each step may occur differently from a stated order unless a specific order is clearly stated in the context. That is, each step may be performed in the same order as stated, may be performed substantially simultaneously, or may be performed in the opposite order.

The terms described below are defined in consideration of functions in the present invention, but may be changed depending on the customary practice, the intention of a user or operator, or the like. Thus, the definitions should be determined based on the overall content of the present specification.

It will be understood that, although the terms first, second, etc. may be used herein to describe various elements, the elements should not be limited by these terms. These terms are only used to distinguish one element from another element. Any references to singular may include plural unless expressly stated otherwise in the context, and it will be further understood that the terms "includes" and/or "having", when used in this specification, specify the presence of stated features, numbers, steps, operations, elements, components, or combinations thereof, but do not preclude the presence or addition of one or more other features, numbers, steps, operations, elements, components, or combinations thereof.

In addition, components in the present specification are discriminated merely according to a function mainly performed by each component. That is, two or more components may be integrated into a single component, or a single component may be separated into or more two components for more detailed functions. Moreover, it is to be noted that each component may additionally perform some or all of a function executed by another component in addition to the main function thereof, and some or all of the main function of each component may be exclusively carried out by another component. Each component may be implemented as hardware or software, or implemented as a combination of hardware and software.

Figure 2:
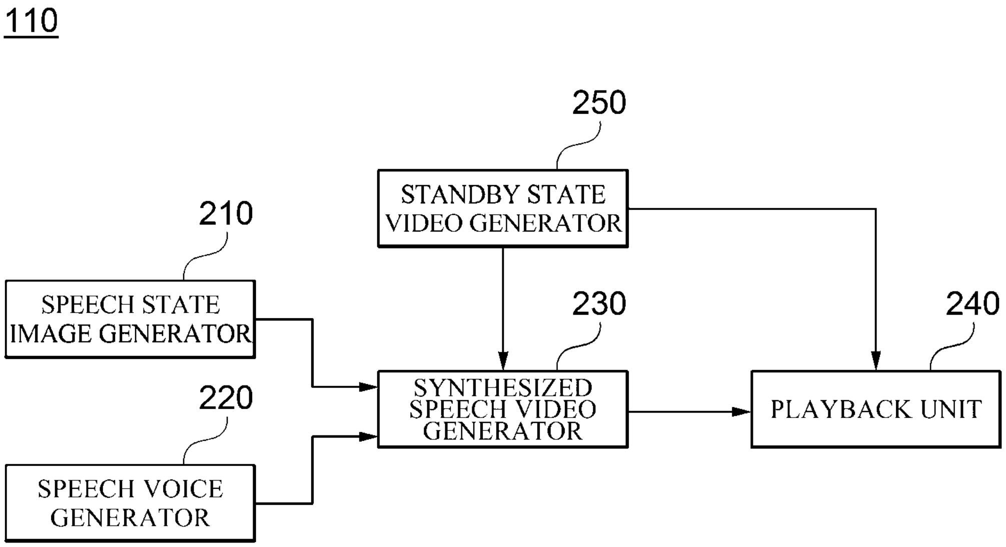
FIG. 2 is a diagram illustrating a speech video providing apparatus according to an exemplary embodiment.
Figure 3:
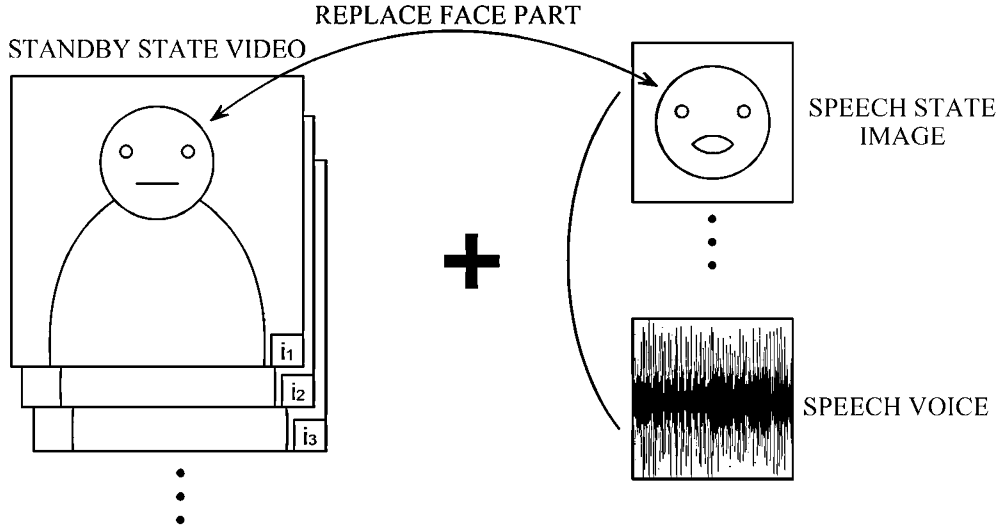
FIG. 3 is a diagram for describing a process of synthesizing a speech state image and a speech voice with a standby state video according to an exemplary embodiment.

FIG. 1 is a diagram illustrating a conversation system using artificial intelligence according to an exemplary embodiment, FIG. 2 is a diagram illustrating a speech video providing apparatus according to an exemplary embodiment, and FIG. 3 is a diagram for describing a process of synthesizing a speech state image and a speech voice with a standby state video according to an exemplary embodiment.

Referring to FIGS. 1 to 3, a conversation system 100 using artificial intelligence may include a speech video providing apparatus 110 and a terminal 120.

The speech video providing apparatus 110 may communicate with the terminal 120 and perform a conversation with a user using the terminal 120 by using artificial intelligence (AI conversation).

The speech video providing apparatus 110 may generate a synthesized speech video in response to text or voice input through the terminal 120 and provide the generated synthesized speech video to the terminal 120.

According to an exemplary embodiment, the synthesized speech video may be a video synthesized based on artificial intelligence and may be a video in which a predetermined person speaks. Here, the predetermined person may be a virtual person or a person widely known to the public, but is not limited thereto.

As illustrated in FIG. 2, the speech video providing apparatus 110 may include a speech state image generator

210, a speech voice generator 220, a synthesized speech video generator 230, and a playback unit 240.

The speech state image generator 210 may generate a plurality of speech state images based on a source of speech contents while sequentially playing back a plurality of standby state videos. In this case, the speech state image may be an image in which a person in the video (a person with the same identity as the person in the standby state video) is in a speech state (a state of speaking to a conversation partner).

According to an exemplary embodiment, the speech state image may be a face image of the person in the standby state video. In this way, the speech state image generator 210 generates speech state images including only the face of the person in the standby state video, thereby generating the speech state images more quickly and reducing data capacity.

The standby state video may include a first section in which the person in the video is in a standby state and a second section for image interpolation between the last frame of the first section and a reference frame. The standby state video may be formed in a video file format (e.g., WebM, Matroska, Flash Video (FLV), F4V, VOB, Ogg Video, Dirac, AVI, AMV, SVI, 3GPP, Windows Media Video, Advanced System Format (ASF), MPEG, or the like). Here, the standby state may be a state before the person in the video speaks (e.g., a state in which the person is listening to the other person or a state in which there is no speech before a conversation, or the like).

The first section of the standby state video includes a series of standby state image frames and may be provided to express natural movements while the person in the video is in the standby state. That is, the first section of each standby state video may be provided to naturally express the facial expression, posture, and action holding hands and listening, tilting the (e.g., nodding, head, and smiling) of the person in the video while the person is listening to a conversation partner.

The second section of the standby state video includes a series of back motion image frames and may be provided for image interpolation between the last frame of the first section and the reference frame. When returning from the last frame of the first section to the reference frame through the frames of the second section, the last frame of the first section and the reference frame may be naturally connected. Here, the reference frame may be the first frame of the first section of the first standby state video among the plurality of standby state videos, but is not limited thereto.

According to an exemplary embodiment, the last frame of the first section of the preceding standby state video and the first frame of the first section of the following standby state video may be naturally connected to each other. Here, natural connection between frames may mean that the movements of a person in the video are naturally connected.

The source of the speech contents is a response to text or voice input through the terminal 120 and may be in a text form, but is not limited thereto and may also be in a voice form.

The source of the speech contents may be generated through artificial intelligence by the speech video providing apparatus 110 analyzing text or voice input through the terminal 120, but is not limited to thereto, the source of the speech contents may be input from an external device (for example, a device that generates the source of the speech contents by analyzing text or voice input through the terminal 120) or an administrator.

The speech voice generator 220 may generate a speech voice based on the source of the speech contents during the playback of the standby state video. Here, the speech voice may correspond to a plurality of speech state images generated by the speech state image generator 210. That is, based on the same source of speech contents, the speech state image generator 210 may generate the plurality of speech state images, and the speech voice generator 220 may generate the speech voice.

Meanwhile, the technology for generating an image or voice based on a source (text or voice) of speech contents is a known technology, so a detailed description thereof will be omitted.

The synthesized speech video generator 230 may generate a synthesized speech video by synthesizing the plurality of speech state images generated by the speech state image generator 210 and the speech voice generated by the speech voice generator 220 with at least some of the plurality of standby state videos.

For example, as illustrated in FIG. 3, the synthesized speech video generator 230 may generate the synthesized speech video by replacing a face of the person in the standby state video with the speech state image (that is, a face part of the person) and synthesizing the speech state image and the speech voice.

According to an exemplary embodiment, the synthesized speech video generator 230 may generate a synthesized speech video by synthesizing the plurality of speech state images and the speech voice with frames within the first sections of at least some of the plurality of standby state videos. In this case, the synthesized speech video generator 230 may synthesize each speech state image and the speech voice starting from the reference frame, that is, the first frame of the first section of the first standby state video. That is, synthesis of the speech state image and the speech voice may be performed only for frames within the first section of each standby state video, and may be performed starting from the first frame of the first section of the first standby state video.

The speech video providing apparatus 110 according to an exemplary embodiment may unify a synthesis point of at least some of the plurality of the standby state videos, the speech state image, and the speech voice into the reference frame (e.g., the first frame of the first section of the first standby state video), thereby easily generating the synthesized speech video by synthesizing the speech state image and the speech voice with at least some of the plurality of standby state videos even without considering other factors (for example, the network environment between the speech video providing apparatus 110 and the terminal 120 or the like), no matter when the speech state image and the speech voice are generated while sequentially playing back the plurality of standby state videos.

The playback unit 240 may sequentially play back the plurality of standby state videos and transmit the standby state videos to the terminal 120.

According to an exemplary embodiment, the playback unit 240 may sequentially and repeatedly play back the first sections of the plurality of standby state videos. For example, the playback unit 240 may sequentially and repeatedly play back the first sections of the plurality of standby state videos in a method of sequentially playing back the first sections from the first standby state video to the last standby state video and then returning to the first frame of the first section of the first standby state video again. In this case, the second section of the last standby state video may be used to naturally connect the last frame of the first section of the last standby state video and the first frame of the first section of the first standby state video. For example, the playback unit 240 may play back the first section of the second standby state video after playing back the first section of the first standby state video, and when playback of the first section of the last standby state video is completed, play back the second section of the last standby state video, thereby naturally returning to the first frame of the first section of the first standby state video.

When the generation of the speech state images and the speech voice is completed while sequentially playing back the first sections of the plurality of standby state videos, the playback unit 240 may play back the second state video after section of the corresponding standby playing back the first section of the standby state video being played back at the time of completion. That is, the playback unit 240 may complete the playback of the first section of the standby state video being played at the time of completion of the generation of the speech state images and the speech voice and immediately play back the second section of the corresponding standby state video, thereby naturally returning to the first frame of the first section of the first standby state video.

When playback of the second section of the standby state video being played back at the time of completion of generation of the speech state images and the speech voice is completed, the playback unit 240 may play back the synthesized speech video and transmit the synthesized speech video to the terminal 120.

As described above, the synthesized speech video may be generated by synthesizing the speech state image and speech voice from the first frame of the first section of the first standby state video. Therefore, the last frame of the first section of the corresponding standby state video and the synthesized speech video may be naturally connected through the playback of the second section of the standby state video being played back at the time of completion of generation of the speech state images and the speech voice.

When the playback of the synthesized speech video ends, the playback unit 240 may sequentially play back the first sections of the plurality of standby state videos again from an ending point in time of the synthesized speech video. In addition, when the playback unit 240 plays back the first section of the last standby state video up to the last frame, the playback unit 240 may sequentially play back the first sections of the plurality of standby state videos by returning to the first frame of the first section of the first standby state video using the second section of the last standby state video.

According to an exemplary embodiment, the speech video providing apparatus 110 may further include a standby state video generator 250.

The standby state video generator 250 may generate a plurality of standby state videos including each a first section and a second section.

Specifically, the standby state video generator 250 may divide a series of standby state images at predetermined frame intervals or predetermined time intervals to generate a plurality of standby state image sets, and generate a back motion image set corresponding to the last standby state image of each standby state image set. In addition, the standby state video generator 250 may generate a plurality of standby state videos in a video file format by disposing each standby state image set in the first section and disposing the back motion image set corresponding to each standby state image set in the second section, and then encoding each standby state image set and the corresponding back motion image set.

The terminal 120 may be communicably connected to the speech video providing apparatus 110 through a communication network.

According to an exemplary embodiment, the communication network may include the Internet, one or more local area networks, wide area networks, cellular networks, mobile networks, other types of networks, or a combination of the above networks.

The terminal 120 may include, for example, a user terminal that wishes to communicate with artificial intelligence (e.g., a smartphone, tablet PC, laptop, desktop PC, or the like), an unmanned ordering kiosk, an electronic information desk, an outdoor advertising screen, robots, or the like.

The terminal 120 may access the speech video providing apparatus 110 through a communication network. In this case, the terminal 120 needs a loading process to receive the plurality of standby state videos from the speech video providing apparatus 110. However, when the plurality of standby state videos are in an image file format rather than a video file format, the data size is large, so it takes a long time to load, and accordingly, there is a limit to adding a posture or gesture of a person in the standby state.

The speech video providing apparatus 110 according to an exemplary embodiment may use the plurality of standby state videos in a video file format rather than an image file format, thereby making it possible to reduce the loading time of the terminal compared to the image file format, and accordingly, possible to add various postures or gestures of the person in the standby state videos.

The speech video providing apparatus 110 according to an exemplary embodiment may generate speech state images and a speech voice while sequentially playing back the plurality of standby state videos, and synthesize the generated images and voice with the plurality of standby state videos, thereby making it possible to generate the synthesized speech video in real time, and accordingly, possible to provide conversation-related services based on artificial intelligence in real time.

In addition, by generating the synthesized speech video by generating a speech state image for a face part of a person in the standby state video and replacing only the face part of the standby state video with the speech state image, it is possible to reduce the amount of data while reducing the time required for generating the synthesized speech video.

In addition, by preparing the standby state videos to each include a first section including standby state image frames and a second section including back motion image frames, returning to a first frame of the first section of the first standby state video through the back motion image frames of the second section, and then synthesizing the speech state images and the speech voice from the first frame of the first section of the first standby state video, it is possible to easily generate the synthesized speech video even without considering other factors, no matter when the speech state image and the speech voice are generated while sequentially playing back the plurality of standby state videos.

Figure 4:
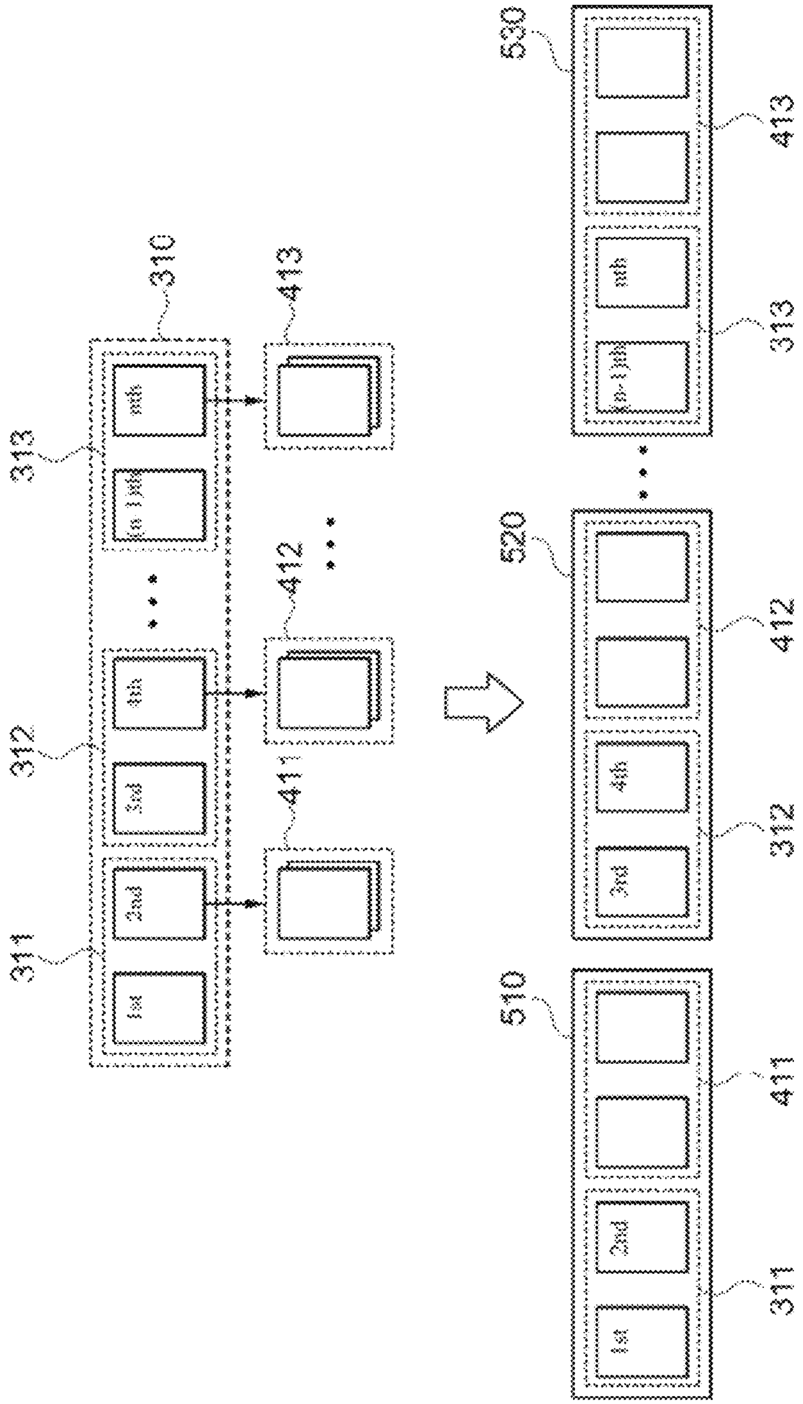
FIG. 4 is a diagram for describing a back motion video according to an exemplary embodiment.

FIG. 4 is a diagram for describing a standby state video according to an exemplary embodiment. FIG. 4 illustrates a case where a series of standby state image frames are divided at two-frame intervals.

Referring to FIG. 4, the standby state video generator 250 may divide a series of standby state images 310 at two-frame intervals to generate a plurality of standby state image sets 311, 312, and 313 and generate a plurality of back motion image sets 411, 412, and 413 corresponding to the last standby state images 2nd, 4th, and nth of the respective standby state image sets 311, 312, and 313. In this case, the first back motion image set 411 may be provided so that the last standby state image 2nd of the first standby state image set 311 is naturally connected to the first standby state image 1st of the first standby state image set 311 through the first back motion image set 411, the second back motion image set 412 may be provided so that the last standby state image 4th of the second standby state image set 312 is naturally connected to the first standby state image 1st of the first standby state image set 311 through the second back motion image set 412, and the third back motion image set 413 may be provided so that the last standby state image nth of the third standby state image set 313 is naturally connected to the first standby state image 1st of the first standby state image set 311 through the third back motion image set 413.

The standby state video generator 250 may generate a plurality of standby state images 510, 520, and 530 in a video file format by disposing the standby state image sets 311, 312, and 313 in the respective first sections and disposing the back motion image sets 411, 412, and 412 corresponding to the respective standby state image sets 311, 312, and 313 in the second sections, and then encoding each the standby state image sets 311, 312, and 313 and the corresponding one of the back motion image sets 411, 412, and 413. For example, as shown in FIG. 4, the standby state video generator 250 may encode the first standby state image set 311 and the first back motion image set 411 to generate the first standby state image 510, encode the second standby state image set 312 and the second back motion image set 412 to generate the second standby state image 520, and encode the third standby state image set 313 and the third back motion image set 413 to generate the third standby state image 530.

Figure 5:
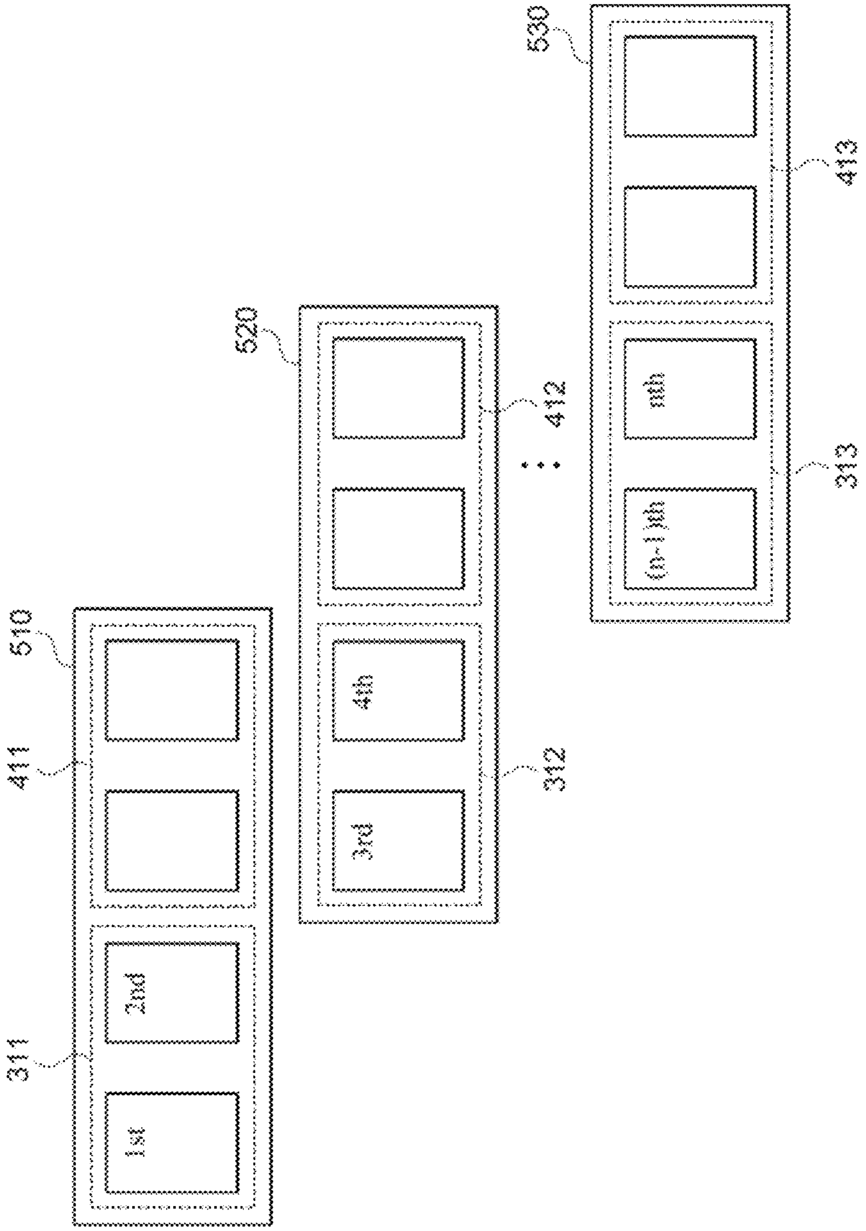
FIG. 5 is a diagram for describing a process of returning a standby state video being played back to a first frame according to an exemplary embodiment.

FIG. 5 is a diagram for describing a process of returning to a first frame of a first section of a first standby state video while playing back a plurality of standby state videos according to an exemplary embodiment.

Referring to FIG. 5, when generation of the speech state images and speech voice is completed in a first frame 3rd of the first section of the second standby state video 520 while sequentially playing back the first sections (standby state image sets 311, 312, and 313) of the plurality of standby state videos 510, 520, and 530, the playback unit 240 may naturally return to the first frame 1st of the first section of the first standby state video 510 by playing up to a last frame 4th of the first section of the second standby state video 520 and then playing back the second section (back motion image set 412) of the second standby state video 520. In addition, the synthesized speech video generator 230 may generate and play back a synthesized speech video by synthesizing the standby speech state images and the speech voice for the standby state images 1st, 2nd, 3rd, 4th, . . . , (n−1)th, and nth) of the respective standby state videos 510, 520, and 530, starting from the first frame 1th of the first standby state video 510.

Figure 6:
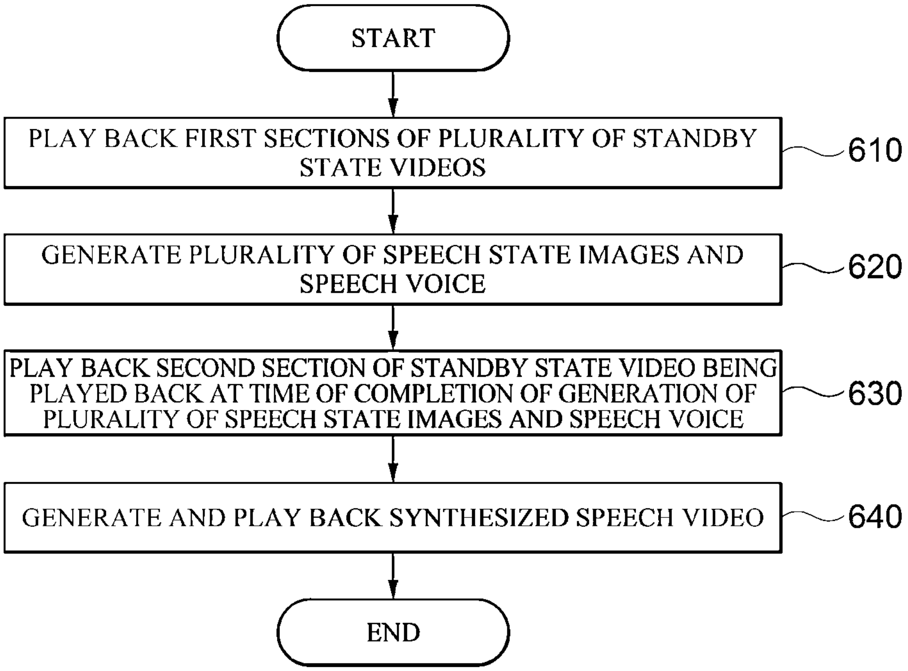
FIG. 6 is a diagram illustrating a method for providing a speech video according to an exemplary embodiment.

FIG. 6 is a diagram illustrating a method for providing a speech video according to an exemplary embodiment. The method for providing a speech video in FIG. 6 may be performed by the speech video providing apparatus in FIG. 1.

Referring to FIG. 6, the speech video providing apparatus may sequentially play back first sections of a plurality of standby state videos (610). In this case, the standby state video may include the first section in which a person in the video is in a standby state and a second section for image interpolation between the last frame of the first section and a reference frame (for example, the first frame of the first section of the first standby state video), and the first and second sections are formed in a video file format.

The speech video providing apparatus may generate a plurality of speech state images and a speech voice based on a source of speech contents (620).

The source of speech contents may be in a text or voice form as a response to text or voice input through a terminal connected to the speech video providing apparatus through a communication network. The source of speech contents may be generated through artificial intelligence by analyzing the text or voice input through the terminal.

The speech state image is an image in which a person in a standby state video is speaking, and may be an image of a face of the person in the video.

When the generating of the plurality of speech state images and the speech voice is completed, the speech video providing apparatus may play back the second section of the standby state video being played back at the time of completion (630). For example, when the generation of the speech state images and the speech voice is completed while sequentially playing back the first sections of the plurality of standby state videos, the speech video providing apparatus may complete the playback of the first section of the standby state video being played back at the time of completion of the generation of the speech state images and the speech voice and immediately play back the second section of the corresponding standby state video. In this way, it is possible to return to the first frame of the first section of the first standby state video.

The speech video providing apparatus may generate and play back a synthesized speech video by synthesizing the plurality of speech state images and the speech voice with at least some of the plurality of standby state videos (640). For example, the speech video providing apparatus may generate a synthesized speech video by replacing the face of the person in the standby state video with a speech state image (that is, a face part of the person) and synthesizing the speech state image and the speech voice.

According to an exemplary embodiment, the speech video providing apparatus may generate a synthesized speech video by synthesizing the plurality of speech state images and the speech voice with frames within the first sections of at least some of the plurality of standby state videos. In this case, the speech video providing apparatus may synthesize each speech state image and the speech voice starting from the reference frame, that is, the first frame of the first section of the first standby state video. That is, synthesis of the speech state image and the speech voice may be performed only for frames within the first section of each standby state video, and may be performed starting from the first frame of the first section of the first standby state video.

Figure 7:
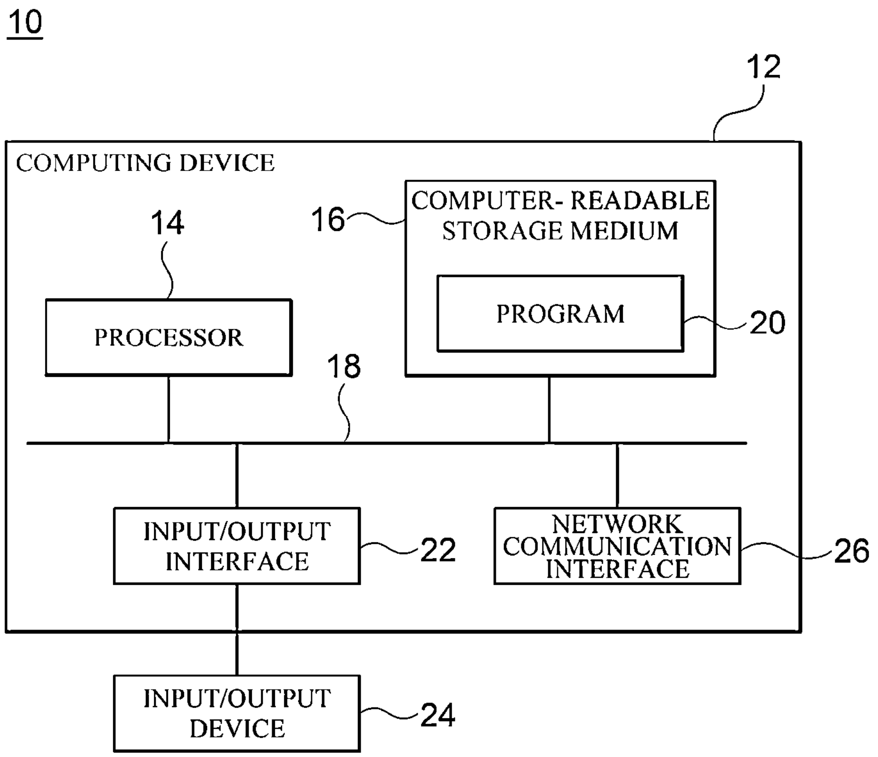
FIG. 7 is a block diagram exemplarily illustrating a computing environment that includes a computing device suitable for use in exemplary embodiments.

FIG. 7 is a block diagram exemplarily illustrating a computing environment that includes a computing device suitable for use in exemplary embodiments. In the illustrated embodiment, each component may have a different function and capability in addition to those described below, and additional components may be included in addition to those described below.

The illustrated computing environment 10 includes a computing device 12. In one embodiment, the computing device 12 may be the speech video providing apparatus 110.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In one embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as one of components constituting the computing device 12, or may be connected to the computing device 12 as a separate device distinct from the computing device 12.

As described above, the present invention has been shown and described with reference to preferred embodiments thereof. It will be understood by those skilled in the art that various modifications in form may be made therein without departing from the spirit and scope of the invention as defined by the appended claims. Accordingly, the scope of the present invention is not limited to the above-described embodiments, but should be construed to include various embodiments within the scope equivalent to the content described in the claims.

What is claimed is:

1. A method for generating a synthesized speech video performed by a computing device, the method comprising:

sequentially playing back first sections of a plurality of standby state videos, wherein each standby state video includes the first section in which a person in the standby state video is in a standby state and a second section for image interpolation between a last frame of the first section and a reference frame, wherein each of the plurality of standby state videos includes a standby state image set including a series of standby state image frames disposed in the first section and a back motion image set including a series of back motion image frames corresponding to the standby state image set disposed in the second section, and is in a video file format generated by encoding each standby state image set and the corresponding back motion image set;

generating a plurality of speech state images in which the person in the standby state video is in a speech state and a speech voice based on a source of speech contents;

completing, when the generating of the plurality of speech state images and the speech voice is completed, playback of the first section of the standby state video being played back at the time of completion, and playing back the second section of the corresponding standby state video; and generating a synthesized speech video by synthesizing the plurality of speech state images and the speech voice with at least some of the plurality of standby state videos.

2. The method of claim 1, wherein the sequential playing back of the first sections of the plurality of standby state videos includes sequentially and repeatedly playing back the first sections of the plurality of standby state videos.

3. The method of claim 1, wherein the last frame of the first section of a preceding standby state video and the first frame of the first section of a standby state video following the preceding standby state video are naturally connected to each other.

4. The method of claim 1, wherein the plurality of speech state images are face images of the person in the standby state video.

5. The method of claim 4, wherein in the generating of the synthesized speech video, the synthesized speech video is generated by replacing a face of the person in the standby state video with each speech state image and synthesizing the speech state image and the speech voice.

6. The method of claim 1, wherein the reference frame is the first frame of the first section of a first standby state video among the plurality of standby state videos.

7. The method of claim 6, wherein in the generating of the synthesized speech video, the synthesized speech video is generated by synthesizing the plurality of speech state images and the speech voice for frames within the first section of each standby state video, starting from the first frame of the first section of the first standby state video.

8. An apparatus for generating a synthesized speech video, comprising:

at least one processor; and a memory storing instructions that, when executed by the at least one processor, cause the at least one processor to:

implement a speech state image generator configured to generate a plurality of speech state images in which a person in a standby state video is in a speech state based on a source of speech contents while sequentially playing back first sections of a plurality of standby state videos, wherein each standby state video includes the first section in which the person in the standby state video is in a standby state and a second section for image interpolation between a last frame of the first section and a reference frame, wherein each of the plurality of standby state videos includes a standby state image set including a series of standby state image frames disposed in the first section and a back motion image set including a series of back motion image frames corresponding to the standby state image set disposed in the second section, and is in a video file format generated by encoding each standby state image set and the corresponding back motion image set;

implement a speech voice generator configured to generate a speech voice based on the source of the speech contents while sequentially playing back the first sections of the plurality of standby state videos;

implement a playback unit configured to sequentially play back the first sections of the plurality of standby state videos, and when the generating of the plurality of speech state images and the speech voice is completed, complete playback of the first section of the standby state video being played back at the time of completion, and play back the second section of the corresponding standby state video; and implement a synthesized speech video generator configured to generate a synthesized speech video by synthesizing the plurality of speech state images and the speech voice with at least some of the plurality of standby state videos.

9. The apparatus of claim 8, wherein the playback unit sequentially and repeatedly plays back the first sections of the plurality of standby state videos.

10. The apparatus of claim 8, wherein the last frame of the first section of a preceding standby state video and the first frame of the first section of a standby state video following the preceding standby state video are naturally connected to each other.

11. The apparatus of claim 8, wherein the plurality of speech state images are face images of the person in the standby state video.

12. The apparatus of claim 11, wherein the synthesized speech video generator generates the synthesized speech video by replacing a face of the person in the standby state video with each speech state image and synthesizing the speech state image and the speech voice.

13. The apparatus of claim 8, wherein the reference frame is the first frame of the first section of a first standby state video among the plurality of standby state videos.

14. The apparatus of claim 13, wherein synthesized speech video generator generates the synthesized speech video by synthesizing the plurality of speech state images and the speech voice for frames within the first section of each standby state video, starting from the first frame of the first section of the first standby state video.

* * * * *